G. A. GOODRICH & P. MILLER.
Improvement in Fly Fans.

No. 124,054.

Patented Feb. 27, 1872.

124,054

UNITED STATES PATENT OFFICE.

GEORGE A. GOODRICH AND PETER MILLER, OF HOPE, OHIO.

IMPROVEMENT IN FLY-FANS.

Specification forming part of Letters Patent No. 124,054, dated February 27, 1872.

Specification describing a new and Improved Fly-Fan, invented by GEORGE A. GOODRICH and PETER MILLER, of Hope, in the county of Franklin and State of Ohio.

Figure 1:
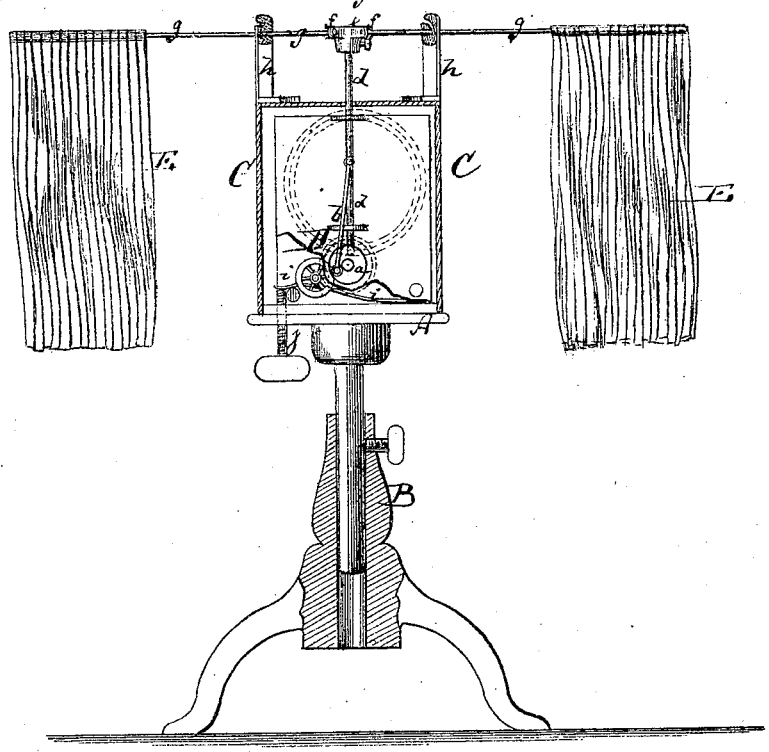
Figure 2:
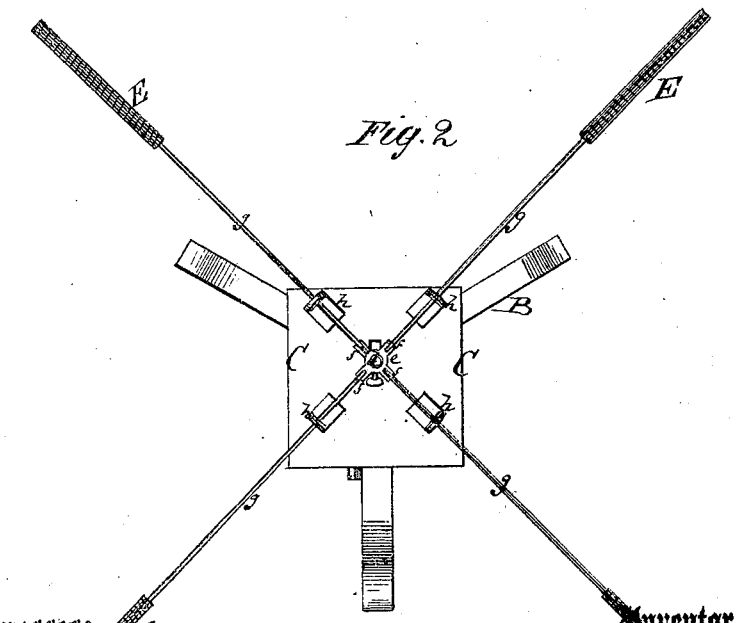

Figure 1 represents a side view, partly in section, of our improved fly-fan. Fig. 2 is a plan or top view of the same.

Similar letters of reference indicate corresponding parts.

The invention relates to a new arrangement of parts in an apparatus consisting essentially of a combination of fly-brushes and operating clock mechanism; and consists in the arrangement hereinafter described and specifically indicated in the claim.

A in the drawing represents the support of our improved fly-fan. It is preferably applied to an extension stand, B, so that it may be vertically adjusted to suitable height. The support A is a plate of rectangular or other suitable form, and is covered by a box or case, C, as shown. A clock-work, D, of suitable kind, is affixed to the top of the support A, and concealed within the box C. It serves to impart rotary motion to a crank-wheel, $a$, whence a pitman, $b$, extends to a vertical rod, $d$, imparting rapid reciprocating motion to the latter. The rod $d$ projects through the top of the box C. To its upper end is affixed a sleeve, $e$, which has a number of projecting ears, $f f$. The shanks or rods $g g$ of the fly-brushes E E are pivoted to the ears $f$ of the sleeve $e$, and nearer their middles supported by posts, $h h$, that project from the top of the box C.

Thus, as reciprocating motion is imparted to the rod $d$ by the clock-work, the shanks $g$ are vibrated, and the brushes swung up and down in rapid succession and simultaneously. The fulcrum of each shank $g$ is on the post $h$, which has a slot to receive the shank.

A spring, $i$, arranged within the box C, can, by a screw, $j$, be crowded with greater or less force against one of the revolving shafts of the clock-work to apply friction, and thereby regulate the speed of the machine.

Having thus described our invention, we claim as new and desire to secure by Letters Patent—

The spring $i$ and screw $j$, arranged on the clock-work of a fly-brush to serve as brake, substantially as set forth.

GEORGE A. GOODRICH.
    PETER MILLER.

Witnesses:
 J. W. GOODRICH,
 WM. KITSMILLER.